US012694066B1

(12) United States Patent
Yin et al.

(10) Patent No.: US 12,694,066 B1
(45) Date of Patent: Jul. 28, 2026

(54) OPTIMIZING WORKFLOWS OF AGENTS IN SCENARIOS IN AN OPTIMIZED WORKFLOW GRAPH

(71) Applicant: INTERNATIONAL BUSINESS MACHINES CORPORATION, Armonk, NY (US)

(72) Inventors: Kun Yan Yin, Ningbo (CN); Li Ni Zhang, Beijing (CN); Yong Fang Liang, Beijing (CN); Chen Yu Chang, Xi an (CN); Pei Jian Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/098,307

(22) Filed: Apr. 2, 2025

(51) Int. Cl.
*G06F 16/00* (2019.01)
*G06F 16/901* (2019.01)
*G06F 16/93* (2019.01)

(52) U.S. Cl.
CPC .......... *G06F 16/93* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 10,559,384 B2 | 2/2020 | Peterson et al. | |
| 11,031,001 B1 | 6/2021 | Cheng et al. | |
| 2020/0028885 A1 | 1/2020 | Gordon et al. | |
| 2022/0391729 A1 | 12/2022 | Duford et al. | |

| | | | |
|---|---|---|---|
| 2025/0045848 A1 | 2/2025 | Focke et al. | |
| 2025/0077559 A1 | 3/2025 | Karri et al. | |
| 2025/0335851 A1* | 10/2025 | Carvalhaes Possas | ..................... G06Q 10/0633 |
| 2025/0378177 A1* | 12/2025 | Conikee | ................ G06F 21/577 |

(Continued)

FOREIGN PATENT DOCUMENTS

| | | |
|---|---|---|
| CN | 118569383 A | 8/2024 |
| KR | 10-1793355 B1 | 11/2017 |
| WO | 2014/145149 A1 | 9/2014 |

OTHER PUBLICATIONS

Masterman et al., "The Landscape of Emerging AI Agent Architectures for Reasoning, Planning, and Tool Calling: A Survey", arXiv:2404.11584v1 [cs.AI], Apr. 17, 2024, 13 pages.

(Continued)

*Primary Examiner* — Bai D Vu
(74) *Attorney, Agent, or Firm* — Konrad Raynes Davda & Victor LLP; David Victor

(57) ABSTRACT

Provided are a computer implemented method, system and computer program product for optimizing workflows of agents in scenarios in an optimized workflow graph. Documents are processed to determine scenarios in which the agents are deployed, tools invoked by the agents, and workflows of the agents and the tools in the scenarios. A workflow graph is generated having nodes representing the agents invoked in the scenarios and the tools invoked by the agents. The workflow graph includes paths between the agents in the scenarios indicating an order in which the agents are invoked in the scenarios and the tools invoked by the agents in the scenarios. A determination is made of workloads at the nodes in the workflow graph. A node in the workflow graph is identified having a workload exceeding a threshold. The identified node is modified in a modified graph to reduce the workload at the identified node.

20 Claims, 10 Drawing Sheets

(56) References Cited

U.S. PATENT DOCUMENTS

2026/0004216 A1*  1/2026  Osborne  ..........  G06Q 10/06316
2026/0073329 A1*  3/2026  Rezaeian  .........  G06Q 10/06316

OTHER PUBLICATIONS

International Searching Authority, "Notification of Transmittal of the International Search Report and the 1 Written Opinion of the International Searching Authority, or Declaration," Patent Cooperation Treaty, May 22, 2026, 10 pages, International Application No.—PCT/EP2026/058326.

* cited by examiner

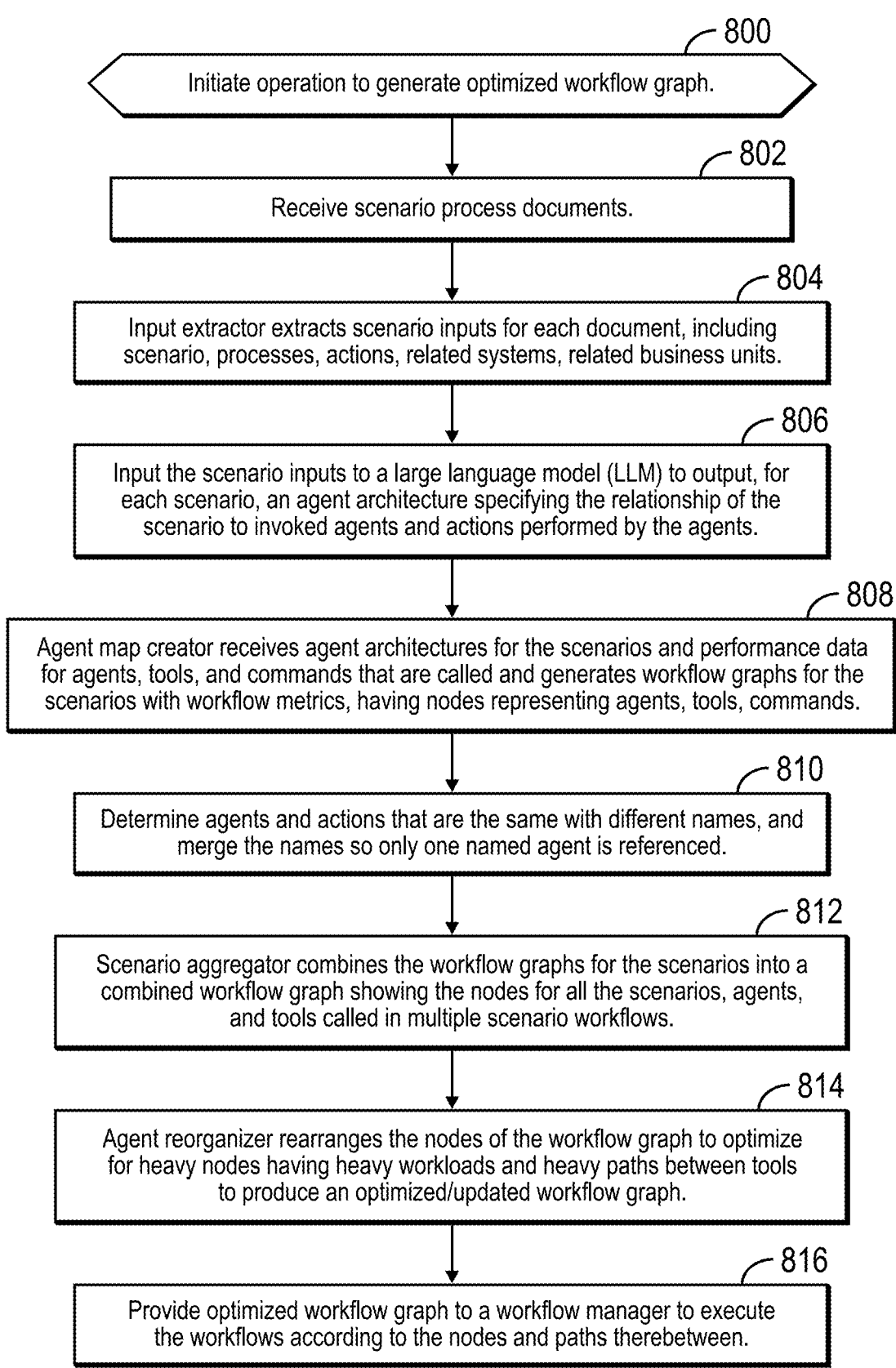

800

Initiate operation to generate optimized workflow graph.

802

Receive scenario process documents.

804

Input extractor extracts scenario inputs for each document, including scenario, processes, actions, related systems, related business units.

806

Input the scenario inputs to a large language model (LLM) to output, for each scenario, an agent architecture specifying the relationship of the scenario to invoked agents and actions performed by the agents.

808

Agent map creator receives agent architectures for the scenarios and performance data for agents, tools, and commands that are called and generates workflow graphs for the scenarios with workflow metrics, having nodes representing agents, tools, commands.

810

Determine agents and actions that are the same with different names, and merge the names so only one named agent is referenced.

812

Scenario aggregator combines the workflow graphs for the scenarios into a combined workflow graph showing the nodes for all the scenarios, agents, and tools called in multiple scenario workflows.

814

Agent reorganizer rearranges the nodes of the workflow graph to optimize for heavy nodes having heavy workloads and heavy paths between tools to produce an optimized/updated workflow graph.

816

Provide optimized workflow graph to a workflow manager to execute the workflows according to the nodes and paths therebetween.

OPTIMIZING WORKFLOWS OF AGENTS IN SCENARIOS IN AN OPTIMIZED WORKFLOW GRAPH

BACKGROUND OF THE INVENTION

The present invention relates to a computer implemented method, system and computer program product for optimizing workflows of agents in scenarios in an optimized workflow graph.

An enterprise system may include numerous process workflows representing agents and other programs invoked to implement the workflows. The workflows in an organization may utilize different programs and processes managed by different units of the organization. For instance, a technical support workflow process may involve an agent or bot answering technical support questions by querying different databases throughout the organization that maintain information related to the question.

SUMMARY

Provided are a computer implemented method, system and computer program product for optimizing workflows of agents in scenarios in an optimized workflow graph. Documents are processed to determine scenarios in which agents are deployed, tools invoked by the agents to perform processes defined for the agents in the documents, and workflows of agents and tools in the scenarios. A workflow graph is generated having nodes representing the agents invoked in the scenarios and the tools invoked by the agents. The workflow graph includes paths between the agents in the scenarios indicating an order in which the agents are invoked in the scenarios and the tools invoked by the agents in the scenarios. A determination is made of workloads at the nodes in the workflow graph. A node in the workflow graph is identified having a workload exceeding a threshold. The identified node is modified in a modified graph to reduce the workload at the identified node. The modified graph is provided to execute the agents and the tools according to the workflow defined at the nodes of the modified graph.

BRIEF DESCRIPTION OF THE DRAWINGS

FIG. 8 illustrates an embodiment of operations to generate an optimized workflow graph from scenario process documents.

DETAILED DESCRIPTION

Figure 1:
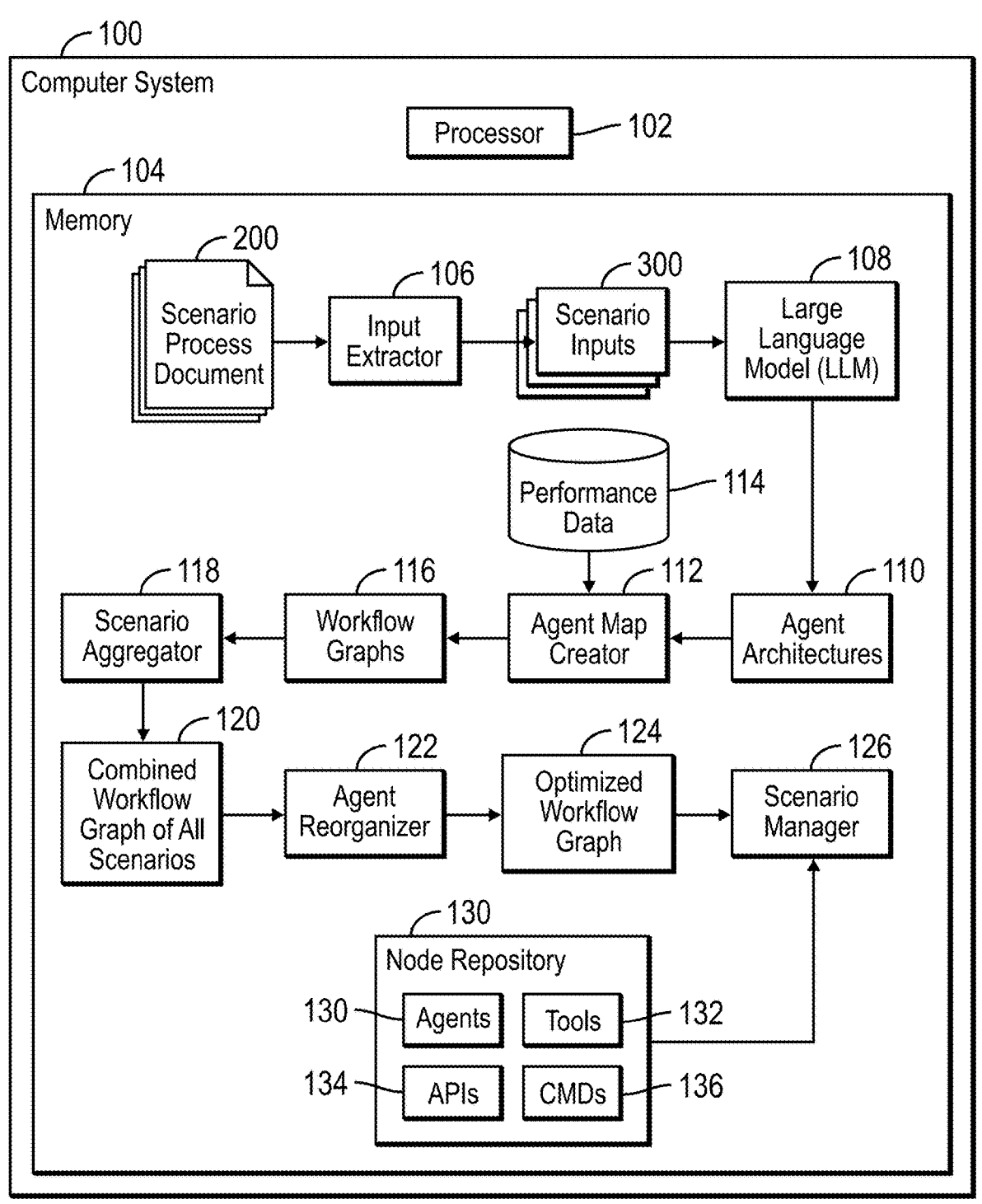
FIG. 1 illustrates an embodiment of a system for optimizing a workflow graph of workflows for different scenarios.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A computer implemented method for managing agents in a computing environment. The method comprises processing documents to determine scenarios in which agents are deployed, tools invoked by the agents to perform processes defined for the agents in the documents, and workflows of the agents and the tools in the scenarios. The method further comprises generating a workflow graph having nodes representing the agents invoked in the scenarios and the tools invoked by the agents. The workflow graph includes paths between the agents in the scenarios indicating an order in which the agents are invoked in the scenarios and the tools invoked by the agents in the scenarios. The method further comprises determining workloads at the nodes in the workflow graph. The method further comprises identifying a node in the workflow graph having a workload exceeding a threshold. The method further comprises modifying the identified node in a modified graph to reduce the workload at the identified node. The method further comprises providing the modified graph to execute the agents and the tools according to the workflow defined at the nodes of the modified graph. Thus, embodiments advantageously allow automatically generating a workflow graph based on scenarios defined in documents representing workflows of agents and tools and then determining a workload at a node to modify the workflow graph and identified node to optimize the workflow to reduce latency and bottlenecks in the workflow when executed.

Example 2: The limitations of any of Examples 1 and 3-10, wherein the identifying the node comprises determining a target node having connecting paths from source nodes calling the target node in different scenarios. Thus, embodiments advantageously optimize the workflow graph at nodes that are involved in multiple scenarios and likely to suffer latency and bottlenecks due to being invoked from multiple scenarios.

Example 3: The limitations of any of Examples 1, 2 and 4-10, wherein the target node comprises a first target node, wherein the source nodes comprise a first source node connecting to the first target node via a first path in a first scenario and a second source node connecting to the first target node via a second path in a second scenario. The method further comprises that modifying the identified node comprises adding a second target node representing an additional instance of an agent or tool represented by the first target node and modifying the first path from the first target node to disconnect from the first target node and connect to the second target node in the first scenario to indicate the first source node calls the agent or the tool represented by the second target node. The second path remains connected to the first target node in the second scenario to indicate the second source node calls the agent or the tool represented by the first target node. Thus, embodiments advantageously reduce processing burdens, bottlenecks, and latency on a target node accessed from multiple scenarios by adding an additional instance of the target node to redistribute processing burdens between the initial target node and the new target node to avoid latency and bottlenecks from forming at a target node called from multiple scenarios.

Example 4: The limitations of any of Examples 1-3 and 5-10, wherein the method further comprises that a third path connects the first target node in the first scenario to a third target node and a fourth path connects the first target node in the second scenario to a fourth target node. The method further comprises that the modifying the identified node comprises modifying the fourth path to connect the second target node to the fourth target node. Thus, embodiments advantageously reduce processing burdens on a target node connected by separate paths to further target nodes by redistributing the calling of the further target nodes among the initial target node and the new target node to reduce processing burdens, bottlenecks, and latency at the initial target node.

Example 5: The limitations of any of Examples 1~4 and 6-10, wherein the method further comprises that identifying the node comprises determining a target node that has the workload exceeding the threshold and connected to by source nodes in different scenarios. The method further comprises dividing the source nodes into n sets. The source nodes in each of the n sets contribute the workloads to the target node that combined are less than the threshold. The method further comprises creating n−1 target nodes representing an agent or tool represented by the target node. The method further comprises, for each set of n−1 sets, modifying the paths of the source nodes in the set to disconnect from the target node and connect to the n−1 target nodes. Thus, embodiments advantageously determine a workload connected in multiple scenarios that is currently overburdened in the workflow and creating additional nodes to which the workload is redistributed such that the workload at the initial and additional nodes does not exceed a workload threshold. In this way, processing burdens, latency and bottlenecks are reduced by redistributing workload across multiple nodes representing multiple instances of an agent or tool.

Example 6: The limitations of any of Examples 1-5 and 7-10, wherein the method further comprises that the identifying the node determines a source node and target node in the workflow graph, such that the source node is invoked from the nodes in multiple scenarios and there are multiple paths between the source node and the target node in the workflow graph representing the source node invoking the target node in the multiple scenarios over the multiple paths. Thus, embodiments advantageously allow modification of a workflow graph when the number of scenario paths between nodes exceeds a threshold to reduce latency, bottlenecks, and processing burdens in the workflow.

Example 7: The limitations of any of Examples 1-5 and 8-10, wherein the method further comprises that the modifying the identified node generates a new node in the modified graph representing functionality of the agents or the tools represented by the source node and the target node. Thus, embodiments advantageously combine the functionality of two nodes having an excessive number of paths therebetween into a single node to eliminate the number of paths therebetween leaving the paths from the nodes calling the single node to improve processing and reduce latency.

Example 8: The limitations of any of Examples 1-7, 9, and 10, wherein the method further comprises removing the source node from the modified graph and modifying the paths from the nodes connecting to the source node to connect to the new node in the modified graph. Thus, embodiments advantageously combine the functionality of two nodes having an excessive number of paths therebetween into a single node and eliminate the source node to eliminate the number of paths to improve processing and reduce latency.

Example 9: The limitations of any of Examples 1-8 and 10, wherein the method further comprises determining whether there are other nodes other than the source node connected to the target node and removing the target node from the modified graph in response to determining that only the source node is connected to the target node. Thus, embodiments advantageously only retain the target node whose functionality was combined in the single node if there are no nodes independently calling the target node in order to reduce the number of nodes and workflow complexity.

Example 10: The limitations of any of Examples 1-9, wherein the method further comprises that the processing the documents comprises extracting the processes, the actions, and the workflows for the scenarios. The method further comprises inputting the extracted processes, actions and workflows for the scenarios into a large language model to generate agent architectures for the scenarios representing agents invoked in the workflows. The method further comprises processing the agent architectures to generate workflow graphs for the scenarios defining how the agents, the tools, and commands are invoked in the workflows. The workflow graph is generated by combining the workflow graphs for the scenarios into a single workflow graph representing the nodes that are invoked from multiple scenarios. Thus, embodiments advantageously provide an improved technique to generate a combined workflow graph of multiple workflow scenarios using a large language model to allow for automated modelling of the workflows.

Example 11 is an apparatus comprising means to perform a method of any of the Examples 1-10.

Example 12 is a machine-readable storage including machine-readable instructions, when executed, to implement a method or realize an apparatus of any of the Examples 1-10.

Example 13: A system comprising one or more processors and one or more computer-readable storage media collectively storing program instructions which, when executed by the processor, are configured to cause the processor to perform a method according to any of Examples 1-10.

Example 14: A computer program product comprising one or more computer readable storage media, and program instructions collectively stored on the one or more computer readable storage media, the program instructions comprising instructions configured to cause one or more processors to perform a method according to any one of Examples 1-10.

Additionally or alternatively, an embodiment in which Example 1 modifies the identified node in a modified graph by performing both of Examples 3 and 7. The alternative embodiment both (1) adds a second target node representing an additional instance of an agent or tool represented by the first target node having a workload exceeding a threshold and modifying paths from the first target node to the new second target node and (2) generates a new node in the modified graph representing functionality of a source node and target node having multiple paths therebetween. In this way, the modified workflow graph performs two optimization. One optimization creates a duplicate node for a node having a heavy workload to redistribute the workload among multiple nodes representing the same agent/tool and a second optimization combines a source and target node having multiple paths therebetween into a single node to reduce workflow paths.

Described embodiments provide improvements to computer technology for generating a combined workflow graph having connected nodes modelling the calling relationship among software programs comprising agents, tools, and commands across scenario workflows. This combined workflow graph showing computer program nodes called from multiple scenarios allows a workload analysis of computer program nodes in the scenarios. Combining the scenarios into a single workflow graph allows analysis of workloads of nodes that are called from computer programs operating in multiple scenarios. Such nodes invoked from multiple scenarios may experience heavy workloads that could affect performance and result in bottlenecks and latencies in the processing by the computer programs represented in the workflow graph.

Described embodiments provide computer technology to modify the nodes, representing computer programs, in the workflows to distribute the workload across program nodes to avoid bottlenecks and latencies and produce an optimized workflow graph representing the calling relationship of computer nodes across different scenarios.

FIG. 1 illustrates an embodiment of a computer system 100 in which embodiments are implemented. The system 100 includes a processor 102 and a main memory 104. The main memory 104 receives a plurality of scenario process documents 200. The documents 200 may comprise structed documents having information on a workflow process for different workflows of computer programs, such as a customer fault report process, manufacturing process, development process, etc. The structured documents 200 may have information on a scenario describing the process, agents, and actions invoked in a workflow for the scenario. The documents 200 may comprise an Extended Markup Language (XML) document, Hypertext Markup Language (HTML) document and documents in other structured formats.

An input extractor 106 extracts scenario inputs 300 from the scenario process documents 200. An instance of scenario inputs 300$_i$ for a scenario is shown in FIG. 3, and may include a scenario 302 identifying the scenario extracted from the document 200; processes 304 invoked to implement the scenario, actions 306 performed as part of the processes 304; a workflow 308 defining the flow of processes and actions to perform the operations of the scenario 302; related systems 310 comprising systems in an organization in which the processes 304 are implemented; and related business units 312 comprising divisions in the organization with which the processes 304 are related.

Figures 3, 4:
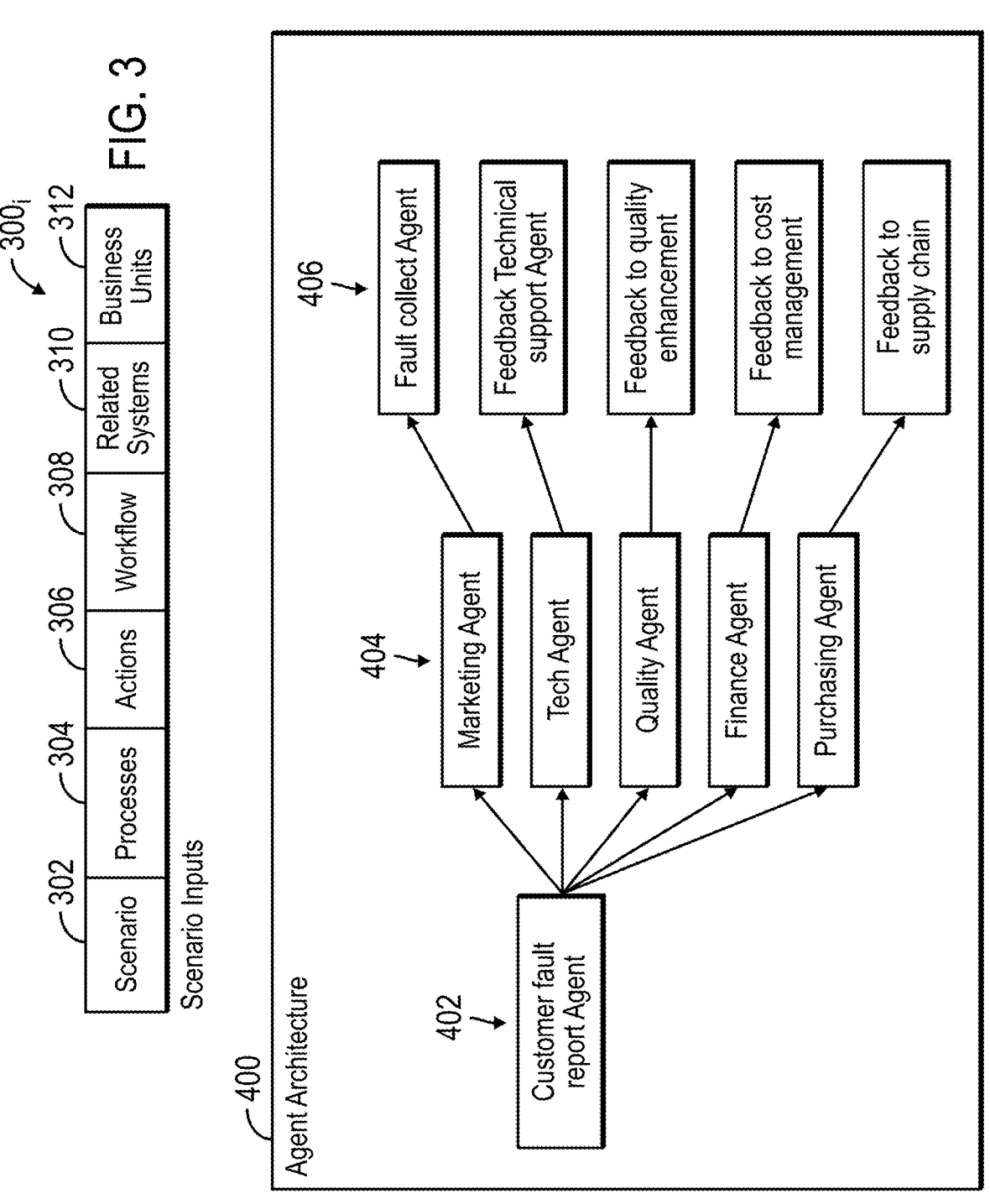
FIG. 3 illustrates an embodiment of scenario inputs extracted from a scenario process document.
FIG. 4 illustrates an embodiment of an agent architecture for a scenario generated from the scenario inputs.

The scenario inputs 300$_i$ shown in FIG. 3 may be extracted from elements in the scenario process documents 200 implemented as a structured document. In alternative embodiments, the documents 200 may be implemented in an unstructured format and a natural language processor may be used to extract the scenario inputs from the unstructured document.

The scenario inputs 300 are inputted into a large language model (LLM) 108 to convert the elements of the scenario documents 200 into agent architectures 110, such as the agent architecture 400 shown in FIG. 4. An agent map creator 112 receives the agent architectures 110 for the different scenarios and processes performance data 114 in the system to determine workload metrics at the agents and other processes in the scenarios. The workload metrics may include work frequency, workload processing and resource consumption, workload distribution, real-time performance, etc. The agent map creator 112 then generates a workflow graph 116 for each scenario, which may provide visualization of the workload metrics and provide an acyclic graph of nodes representing the calling relationship of artificial intelligence (AI) agents, tools, application programming interfaces (API), and commands to implement the processes and actions defined in a scenario process document. The agents, tools, APIs, and commands in a scenario may be represented as nodes in the workflow graph 116.

An agent comprises a bot or program that may implement a machine learning model and artificial intelligence to perform a process, such as provide answers to questions from a human user. A tool may comprise a software program that may be invoked by agents and other tools, such as a web server, database program, etc. A tool may implement a machine learning model.

A scenario aggregator 118 determines common nodes among the workflow graphs 116 generated for the scenarios and generates a combined workflow graph of all scenarios 120 where the workflows of different scenarios share nodes of a common agent, tool or other components invoked from multiple scenarios. For instance, the workflow of multiple scenarios may call the same agent or tool to perform operations. Receiving calls from multiple scenarios increases the load and processing burdens on those agents or tools invoked in the different scenarios.

An agent reorganizer 122 may process the combined workflow graph 120 to determine nodes, representing agents or tools, having a workload level exceeding a threshold level. Such nodes having heavy workloads may be referred to as heavy nodes. The agent reorganizer 122 may then create one or more additional nodes representing additional processing instances of the heavy node and readjust the workflow paths from the different scenarios to invoke one of the original heavy node or the created additional node instances to redistribute the heavy workload from the heavy node to a plurality of nodes representing instances of the agent or tool represented by the heavy node. This modified workflow with additional agent nodes forms an optimized workflow graph 124 that optimizes the workflow among nodes shared by different scenarios by redistributing the workload at the heavy node to multiple instances of the heavy node.

The agent reorganizer 122 may also determine tool nodes, representing software programs or tools that are invoked, that have a determined large number of paths between the tool nodes from different scenarios exceeding a path threshold. Tool nodes having multiple paths therebetween comprising a number of paths exceeding a path threshold are referred to as "heavy paths". These paths between the tool nodes from the different scenarios represent a source tool node calling the target tool node in different scenarios. The agent reorganizer 122 may optimize the heavy paths in an optimized workflow by combining the source tool node and target tool node into a single node having the functionality of the combined source and target tool nodes. The agent reorganizer 122 may redirect the paths in the workflow graph 120 from the calling nodes in different scenarios to the source tool node to the new combined node in the optimized workflow graph 124. The agent reorganizer 122 may remove the source tool node in the optimized workflow graph 124. If the workflow graph 120 has nodes directly calling the target tool node, then the agent reorganizer 122 may leave the target tool node in the optimized workflow graph 124 to retain those direct calls to the target tool node in the optimized workflow graph 124.

A scenario manager 126 receives the optimized workflow graph 124 and processes to manage the calls from different nodes in different invoked scenarios. Upon a node being called, the scenario manager 126 may access the node from a node repository 128 having the different agents 130, tools 132, APIs 134, and commands 138 instantiated for nodes in the optimized workflow graph 124.

The memory 104 may comprise suitable volatile or non-volatile memory devices known in the art. For instance, the memory 104 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (Efram), nanowire-based non-volatile memory, and Direct In-Line Memory Modules (DIMMs), NAND storage, e.g., flash memory, Solid State Drive (SSD) storage, non-volatile RAM, etc.

Generally, program modules, such as the program components 106, 108, 112, 118, 122, 126, 130, 132, 134, 136, among others, may comprise routines, programs, objects, components, logic, data structures, and so on that perform particular tasks or implement particular abstract data types. The program components and hardware devices of the system 100 may be implemented in one or more computer systems, where if they are implemented in multiple computer systems, then the computer systems may communicate over a network.

The program components 106, 108, 112, 118, 122, 126, 130, 132, 134, 136, among others, may be accessed by the processor 102 from the memory 104 to execute. Alternatively, some or all of the program components 106, 108, 112, 118, 122, 126, 130, 132, 134, 136, may be implemented in separate hardware devices, such as Application Specific Integrated Circuit (ASIC), Field Programmable Gate Arrays (FPGAs) and other hardware devices.

The functions described as performed by the program components 106, 108, 112, 118, 122, 126, 130, 132, 134, 136, among others, may be implemented as program code in fewer program modules than shown or implemented as program code throughout a greater number of program modules than shown.

Certain of the components, such as the input extractor 106, LLM 108, agent map creator 112, scenario aggregator 118, and agent reorganizer 122, may use machine learning algorithms, such as deep learning algorithms and natural language processor (NLP) algorithms. Program components implementing machine learning models may be implemented in an Artificial Intelligence (AI) hardware accelerator, such as an FPGA or a graphics processing unit (GPU).

In certain embodiments, components, such as the LLM 108, implementing a machine learning model, may use machine learning and deep learning algorithms, such as decision tree learning, generative AI, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc.

For artificial neural network program implementations, the LLM 108 may be trained using as input the scenario outputs 300 to produce as output the desired agent architectures in the target programming language for the scenarios, i.e., ground truth architectures. In certain embodiments, the LLM 108 may be trained using backward propagation to adjust weights and biases at nodes in a hidden layer to produce their output based on the received inputs. In backward propagation, biases at nodes in the hidden layer are adjusted accordingly to produce the output, such as agent architectures, from input comprising the scenario inputs, with specified confidence levels based on the input parameters. Backward propagation may comprise an algorithm for supervised learning of artificial neural networks using gradient descent to minimize the errors in predictions. Given a large language model artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In further embodiments, techniques other than backward propagation may be used to train the LLM 108 using the scenario inputs 300 and ground truth agent architectures.

The arrows shown in FIG. 1 between the components in the memory 104 represent a data flow between the components.

Figure 2:
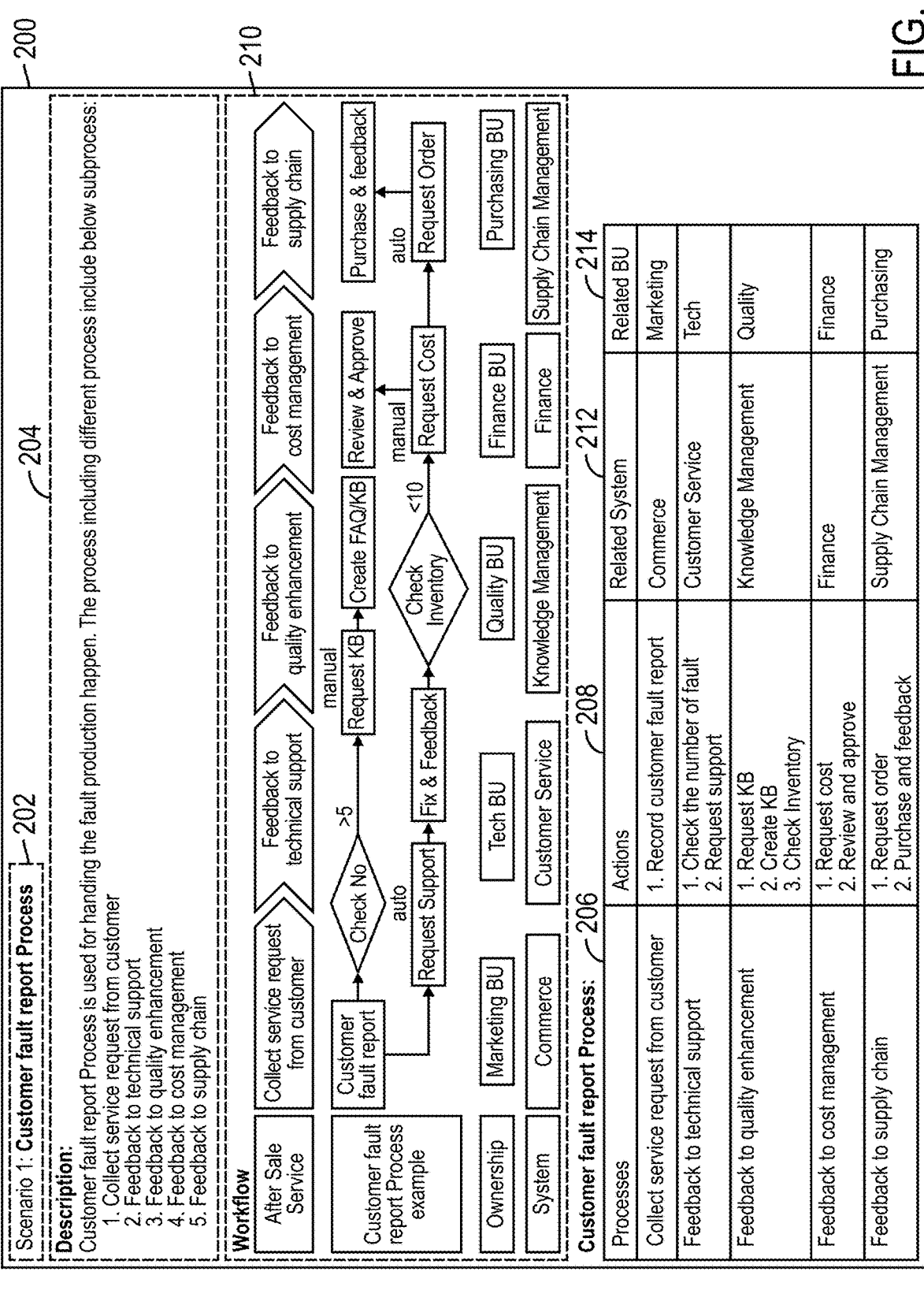
FIG. 2 illustrates an embodiment of a scenario process document having information on a scenario defining a workflow of agents and processes.

FIG. 2 illustrates an example of a scenario process document having structured elements for a customer fault report process. The scenario 302 may be extracted from the title element 202 in the document 200. The processes 304 may be extracted from the description element 204 and the elements in the processes column 206 in the document 200. The actions 306 input may be extracted from the elements in the actions column 208 of the document. The workflow input 308 may be extracted from the workflow element 210 in the document. The related systems 310 input may be extracted from the related system column 212 and the business unit input 312 may be extracted from the business unit column 214 of the document 200.

FIG. 4 illustrates an example 400 of an agent architecture 110 for the scenario process document 200 having a scenario agent 402 to start the customer fault report scenario. The agents 404, organized by business unit, are invoked to initiate the processes for the scenario. The actions 406 are invoked by the agents 404 to carry out the scenario operations.

Figure 5:
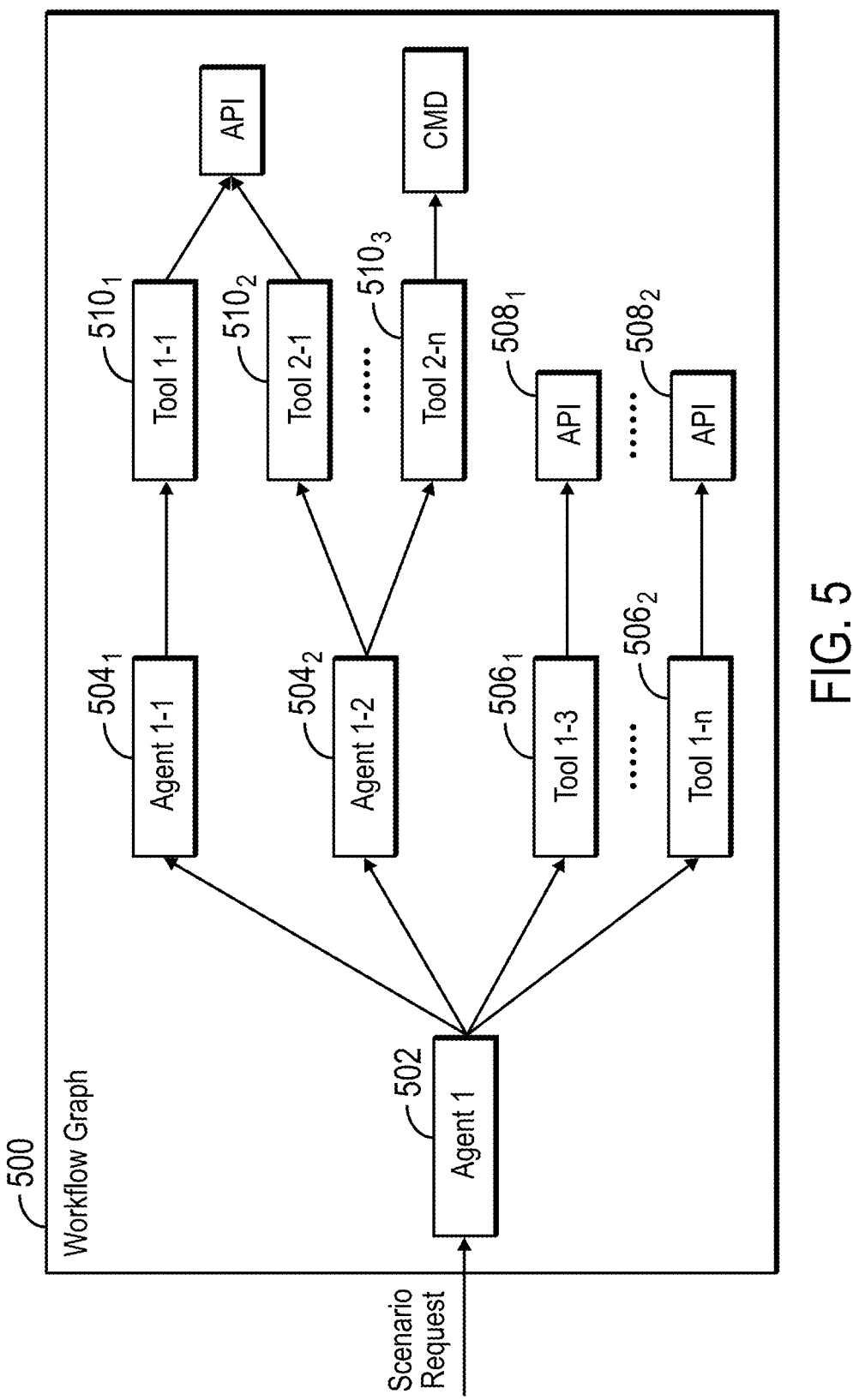
FIG. 5 illustrates an embodiment of a workflow graph for a scenario defining calling relationships among agents, tools, commands and application programming interfaces (APIs) generated from an agent architecture for the scenario.

FIG. 5 illustrates an example 500 of a workflow graph 116 for a scenario generated by the agent map creator 112 that includes the initial scenario agent 502 invoked to start the scenario by invoking the process agents 5041, 5042 and tools 5061, 5062. The workflow graph 500 further shows tools 5061, 5062 invoking APIs 5081, 5082 and agents 5041, 5042 invoking tools 5101, 5102, 5103. The tools 5101, 5102, 5103 may further invoke APIs and commands. In this way the workflow graph 500 shows the order in which agents, tools, APIs, and commands call each other, i.e., are invoked, in the workflow.

Figure 6:
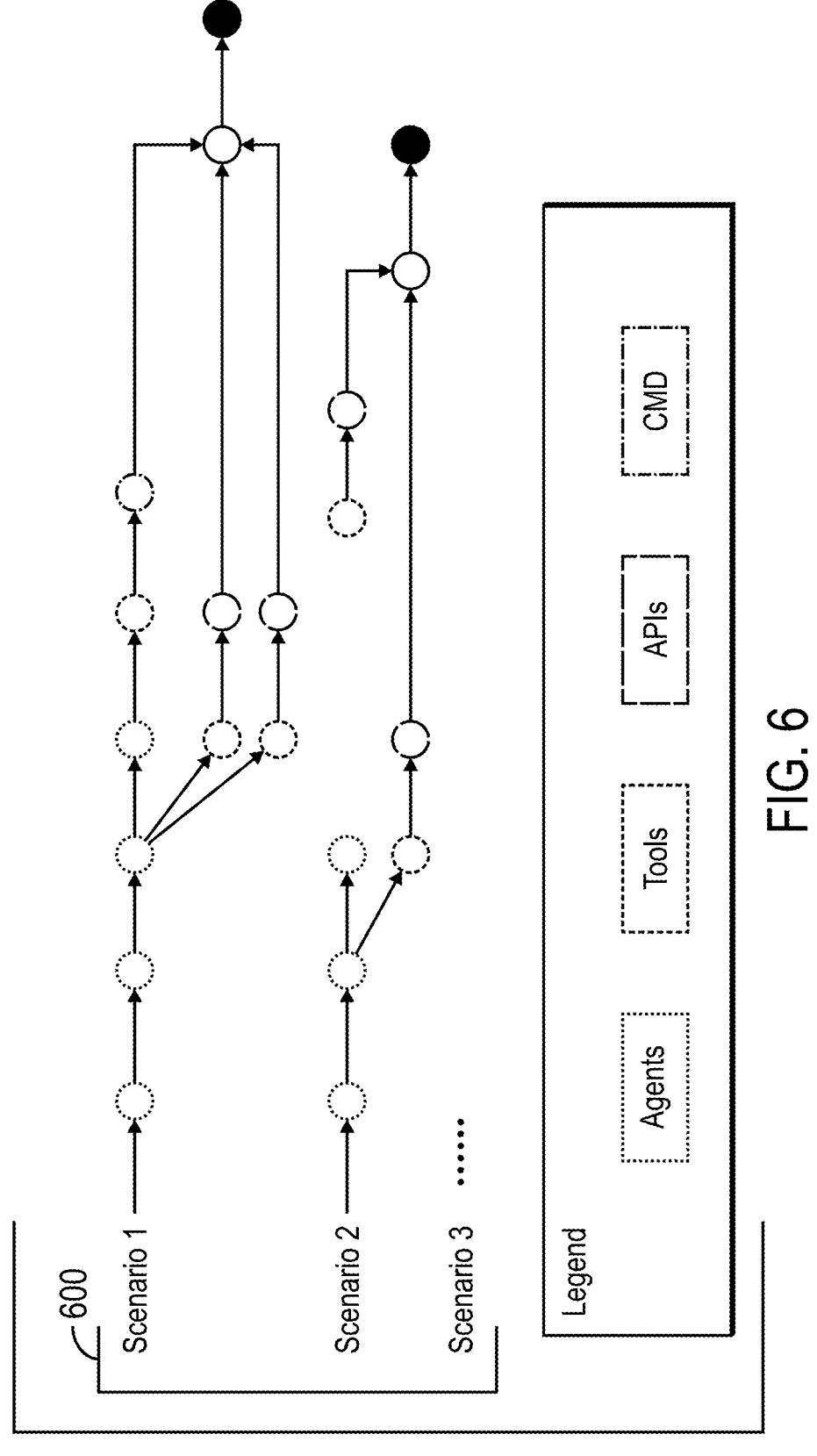
FIG. 6 illustrates an embodiment of nodes of workflows for different scenarios.

FIG. 6 illustrates an example 600 of workflow graphs 116 for different scenarios of nodes comprising agents, tools, APIs, and commands.

Figure 7:
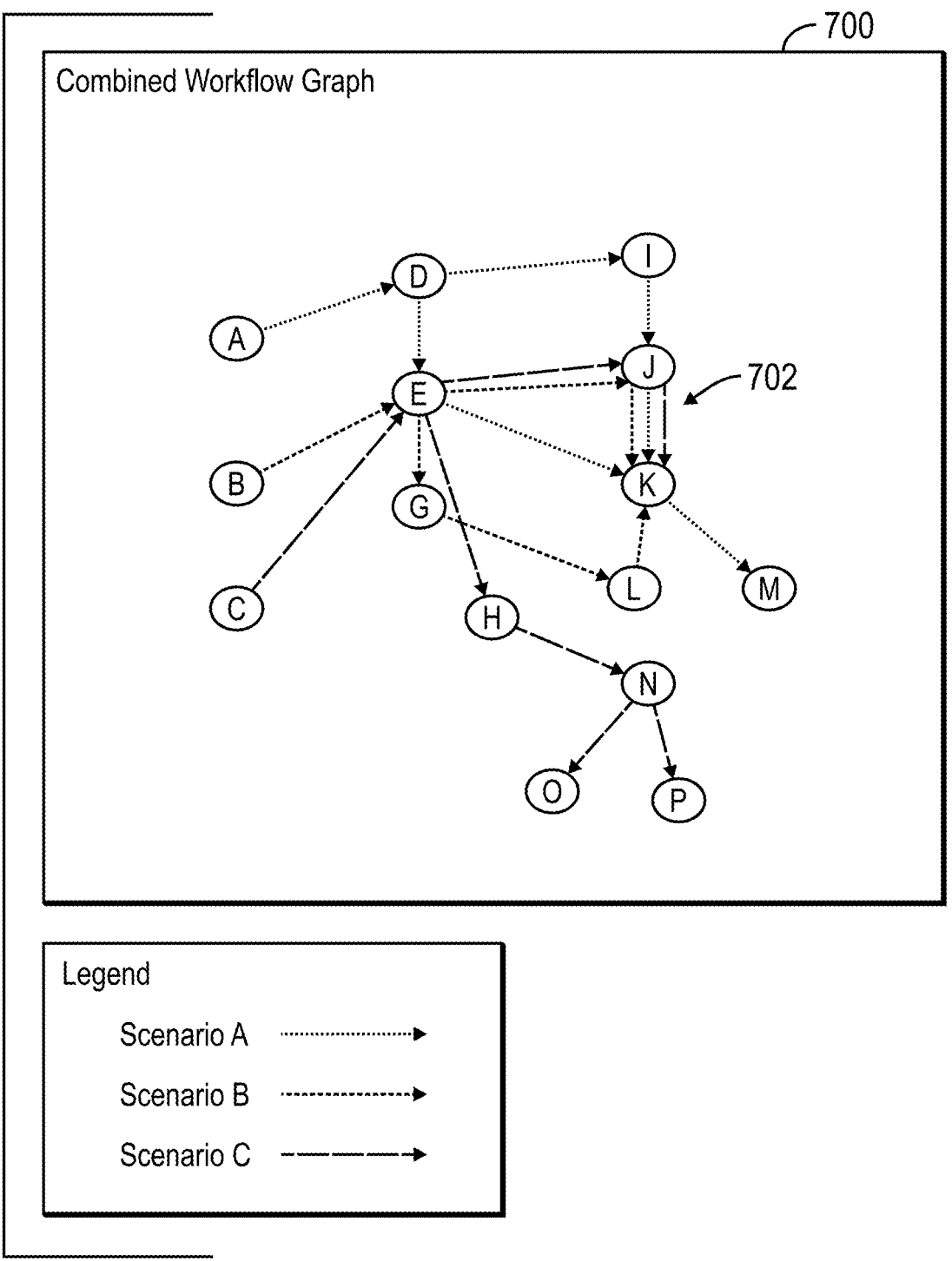
FIG. 7 illustrates an embodiment of a combined workflow graph having nodes from the workflows of different scenarios including nodes called from different scenarios.

FIG. 7 illustrates an example 700 of a combined workflow graph 120 for all scenarios A, B, C. In Example 700 there are three scenarios starting at nodes A, B, C. Scenario A includes nodes A, D, E, I, J, K, M. Scenario B includes nodes B, E, J, K, G, L. Scenario C includes nodes C, E, J, K, N, O, P. Many of the nodes are shared among scenarios as shown by the paths from the different scenarios that flow through shared nodes E, J, K. The paths between the nodes illustrate the source and target of calling between nodes. The agents or tools represented by nodes E, J, K are called by agents or tools represented by nodes B, C, D, E, I, J.

FIG. 8 illustrates an embodiment of operations performed by components, such as, but not limited to, components 106, 108, 112, 118, 122, 126 in FIG. 1, to create an optimized workflow graph for execution by the scenario manager 126. Upon initiating (at block 800) operations to generate an optimized workflow graph, such as optimized workflow graph 124, scenario process documents are received. An input extractor, e.g., 106, extracts (at block 804) scenario inputs, e.g., 300$_i$, for each scenario document. The information extracted from each scenario document may include processes, actions, related systems, related business units, etc. The scenario inputs are inputted (at block 806) to a large language model, e.g., 108, to output, for each scenario, an agent architecture, e.g., 110, 400, specifying the relationship of agents and actions invoked in the scenario.

Agent map creator, e.g., 112, receives (at block 808) the agent architectures for the scenarios and performance data for the agents, tools, and commands that have been called and, in response, generates workflow graphs for the scenarios with workflow metrics, having nodes representing agents, tools, commands, and APIs and paths therebetween showing the caller/callee relationship between the nodes. The agent map creator may further determine (at block 810) agents and actions that are the same, e.g., have the same functionality, with different names, and merge the names for these duplicate agents so only one named agent is referenced.

A scenario aggregator, e.g., 118, combines (at block 812) the workflow graphs for the scenarios into a combined workflow graph, e.g., 700, showing the nodes for all the scenarios including agents and tools called in multiple scenario workflows. An agent reorganizer, e.g., 122, rearranges (at block 814) the nodes of the combined workflow graph to optimize for heavy nodes having heavy workloads and heavy paths between tools to produce an optimized/updated workflow graph, e.g., 124. The optimized workflow graph is provided (at block 816) to a workflow manager, e.g., 126, to execute the workflows according to the nodes and paths therebetween to implement the scenarios when invoked.

The embodiment of FIG. 8 provides improved techniques to generate from a document description a workflow of agents and tools invoked to automatically generate an optimized single workflow graph that is optimized across scenarios that share nodes. This optimized workflow graph is then used by a workflow manager to determine the flow of operations of computer programs represented by the nodes in the different scenario workflow and track the workload at each of the nodes in the combined scenario workflows.

Figure 9:
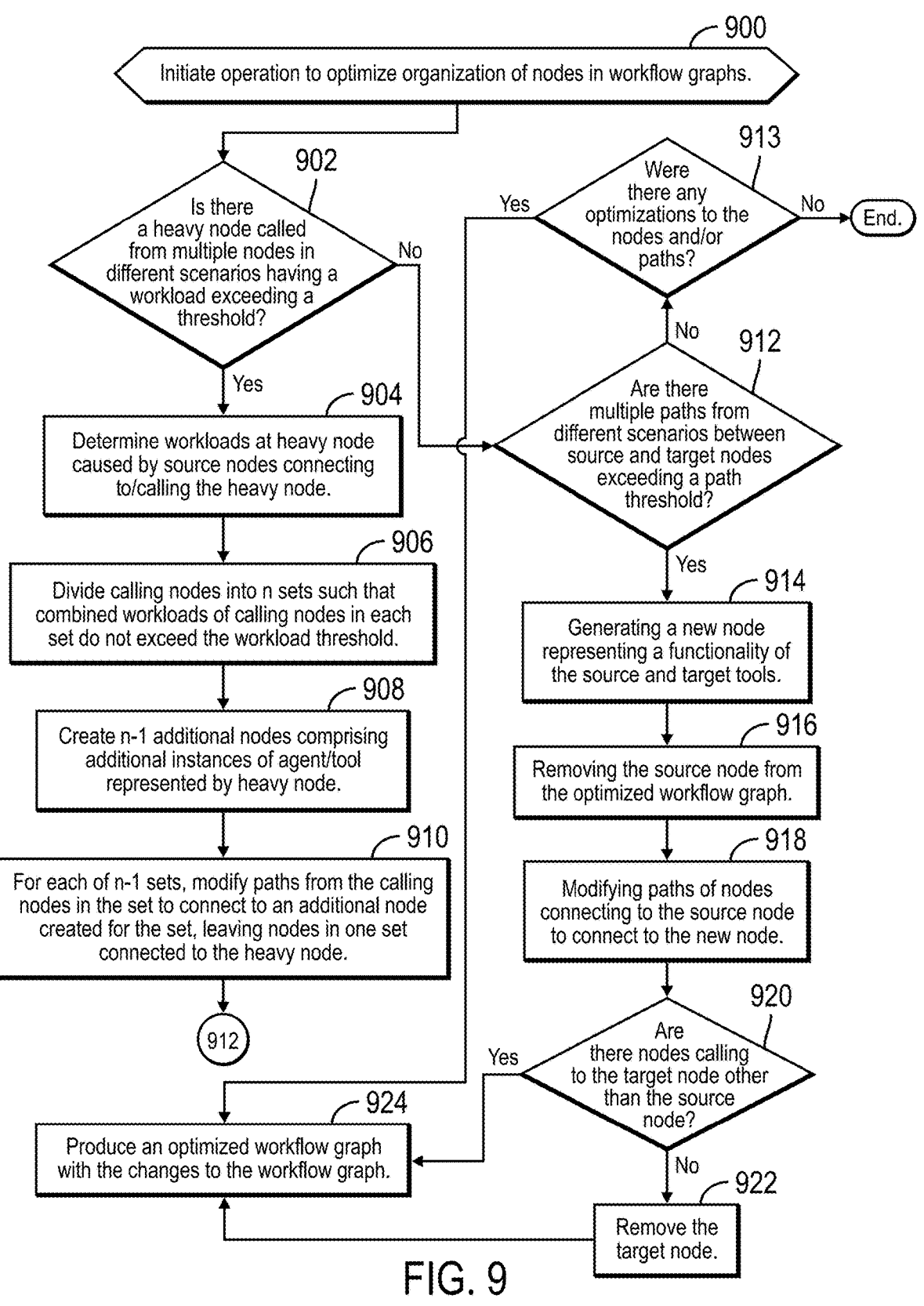
FIG. 9 illustrates an embodiment of operations to optimize a combined workflow graph across scenarios.

FIG. 9 illustrates an embodiment of operations performed by an agent reorganizer, e.g., 122, to modify nodes in the combined workflow to optimize the workflow based on the workloads at the nodes across scenarios. Upon initiating (at block 900) an operation to optimize the organization of nodes in a combined workflow across scenarios, a determination is made (at block 902) whether there is a "heavy node" in the workflow, comprising a node representing a program called by nodes in multiple scenarios, having a workload exceeding a threshold, such as a high processing or resource usage. If there are heavy nodes, then the operations at blocks 904-910 are performed for each heavy node. If (at block 902) there is such a heavy node, a determination is made (at block 904) of workloads at the heavy node caused by source nodes calling/invoking the heavy node. The agent reorganizer may then divide (at block 906) calling nodes into n sets such that combined workloads of calling nodes in each set do not exceed the workload threshold. The agent reorganizer creates (at block 908) n–1 additional nodes comprising additional instances of the agent or tool represented by the heavy node to redistribute the workload from the calling node to multiple instances of the heavy node.

For each of the n–1 sets, the agent reorganizer modifies (at block 910) paths from the calling nodes in the set to connect to the additional node created for the set. This leaves nodes in one set connected to the initial heavy node and the nodes in the other n–1 sets connected to one of the created additional nodes.

From block 910 or the NO branch of block 902, the agent reorganizer determines (at block 912) multiple paths from different scenarios between source and target nodes exceeding a path threshold. If (at block 912) there are multiple paths between two nodes, then the operations at blocks 914-924 are performed for each pair of nodes having a number of paths therebetween exceeding the path threshold. The agent reorganizer generates (at block 914) a new node representing a functionality of the source and target nodes having the multiple paths exceeding the path threshold. The source node is removed (at block 916) from the optimized workflow graph. Paths of nodes connecting to the source node are modified (at block 918) to connect to the new node.

If (at block 920) there are nodes calling the target node other than the source node, then the target node remains separate from the new node in the optimized workflow graph. Otherwise, if there are no nodes calling/connecting to the target node, then the target node is removed (at block 922) from the optimized workflow graph.

If (at block 912) the number paths between any two nodes do not exceed the path threshold, then if (at block 913) there were no optimizations made to the nodes and/or paths of the combined workflow, control ends.

From block 922, the YES branch of block 920 or the YES branch of block 913 an optimized workflow graph is produced (at block 924) with the changes made to the combined workflow graph.

With the embodiment of FIG. 9, the reorganizer agent may create duplicate instances of heavy nodes called in multiple scenarios to distribute the workload from calling nodes in different scenarios across a plurality of instances of the heavy node to avoid latency, excessive workload burdens, and bottlenecks on a single node in the workflow. Further, an excessive number of paths from different scenarios, e.g., heavy paths, between two nodes in the combined workflow may indicate a heavy load of calls from the source node to the target node. In such case, the two nodes may be combined in a single node to eliminate the heavy paths. This combination results in one node having the functionality of the source and target nodes having the heavy paths. These optimizations to the combined workflow provide an improved workflow graph that is optimized to distribute workloads across nodes to avoid bottlenecks and processing delays.

Figure 10A:
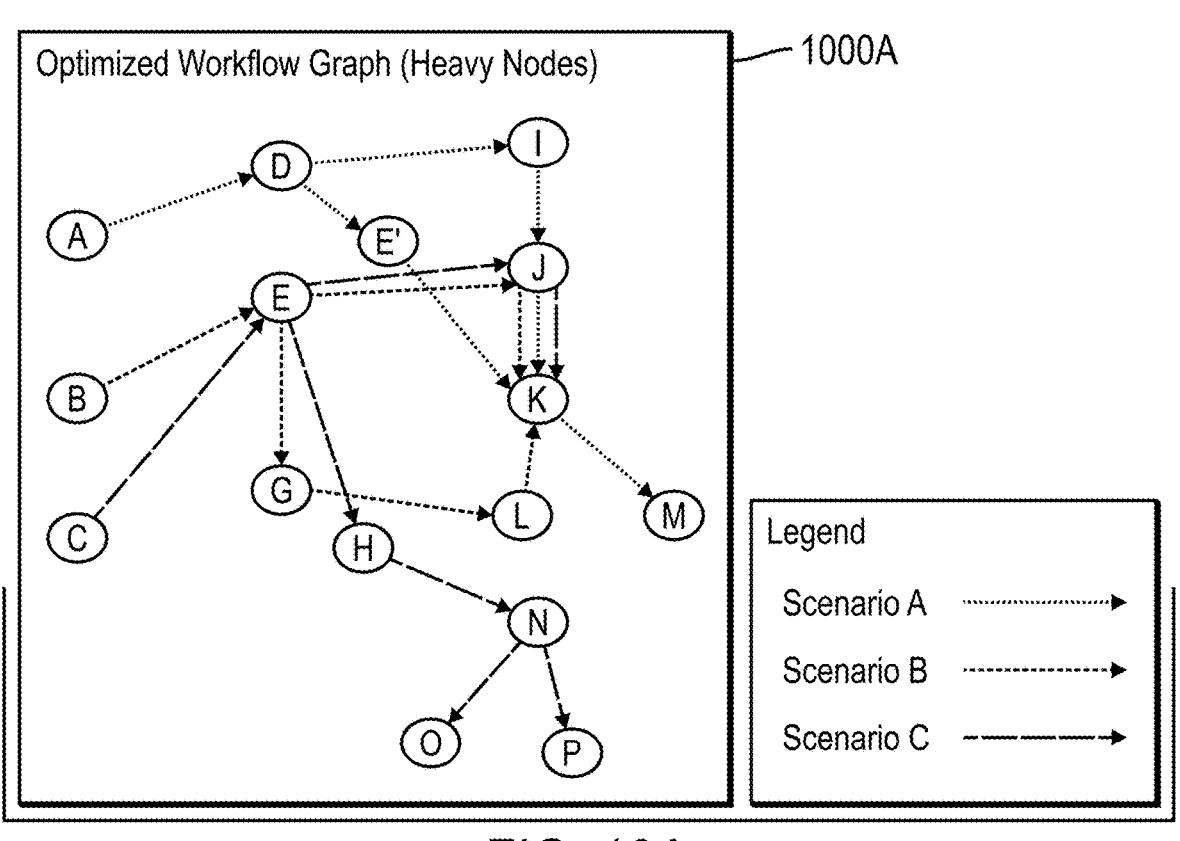
FIGS. 10A and 10B illustrate examples of how a combined workflow graph is modified for optimization.

FIG. 10A illustrates an example 1000A of an optimized workflow according to the operations of FIG. 9 that splits heavy node E in the combined workflow graph 700 into two nodes E and E'. This splitting distributes the paths from nodes D, B, C in scenarios A, B, C, respectively, in workflow graph 700 among nodes E and E'. Node E' comprises a duplicate instance of the agent or tool represented by node E. In optimized workflow 1000A, node D in scenario A is redirected to the new node E' to reduce the workload burdens on node E by splitting heavy node E.

Figure 10B:
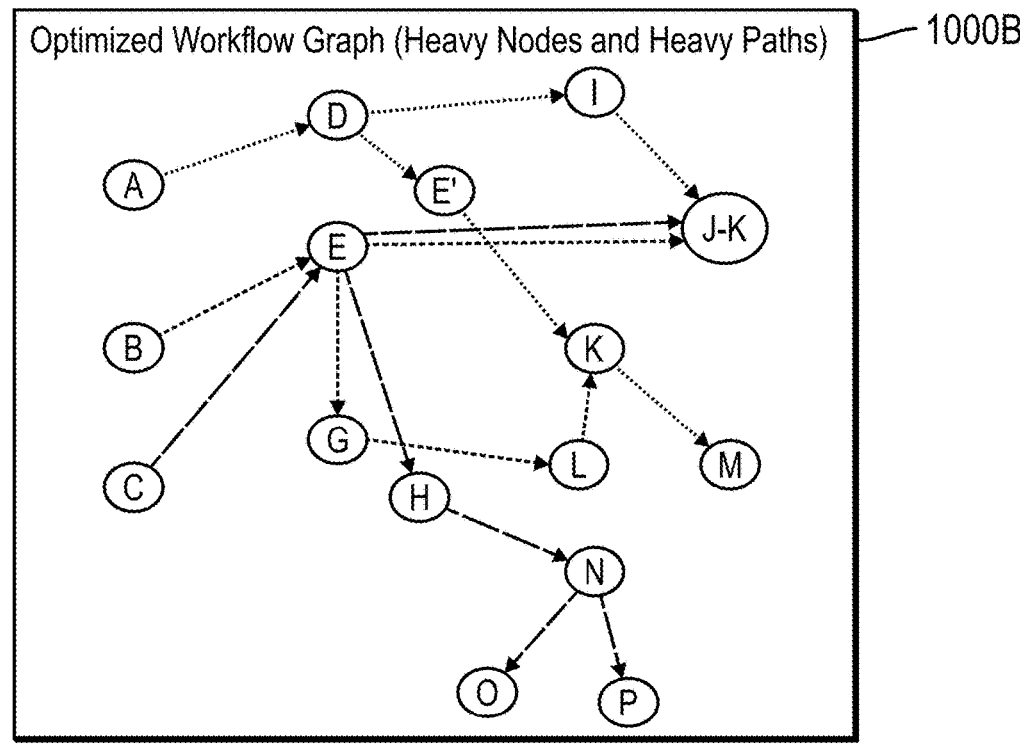

FIG. 10B illustrates an example 1000B of an optimized workflow according to the operations of FIG. 9 that illustrates the splitting of heavy node E as shown in FIG. 10A and the elimination of the heavy paths, shown as paths 702 in FIG. 7, between nodes J and K in the combined workflow 700. The nodes J and K are combined into a single node J-K with the paths eliminated. The new node J-K includes the functionality of the agents and/or tool in nodes J and K in combined workflow 700. The nodes E and I that called node J in the combined workflow 700 are redirected to the new node J-K. Node K that was directly called by node E in scenario A remains to retain this calling relationship.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

In the flowcharts and description, when there is a condition with different operations described as performed depending on the result of the condition, all results of the condition may occur at different times resulting in the different operations performed for the different results of the condition at different times.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
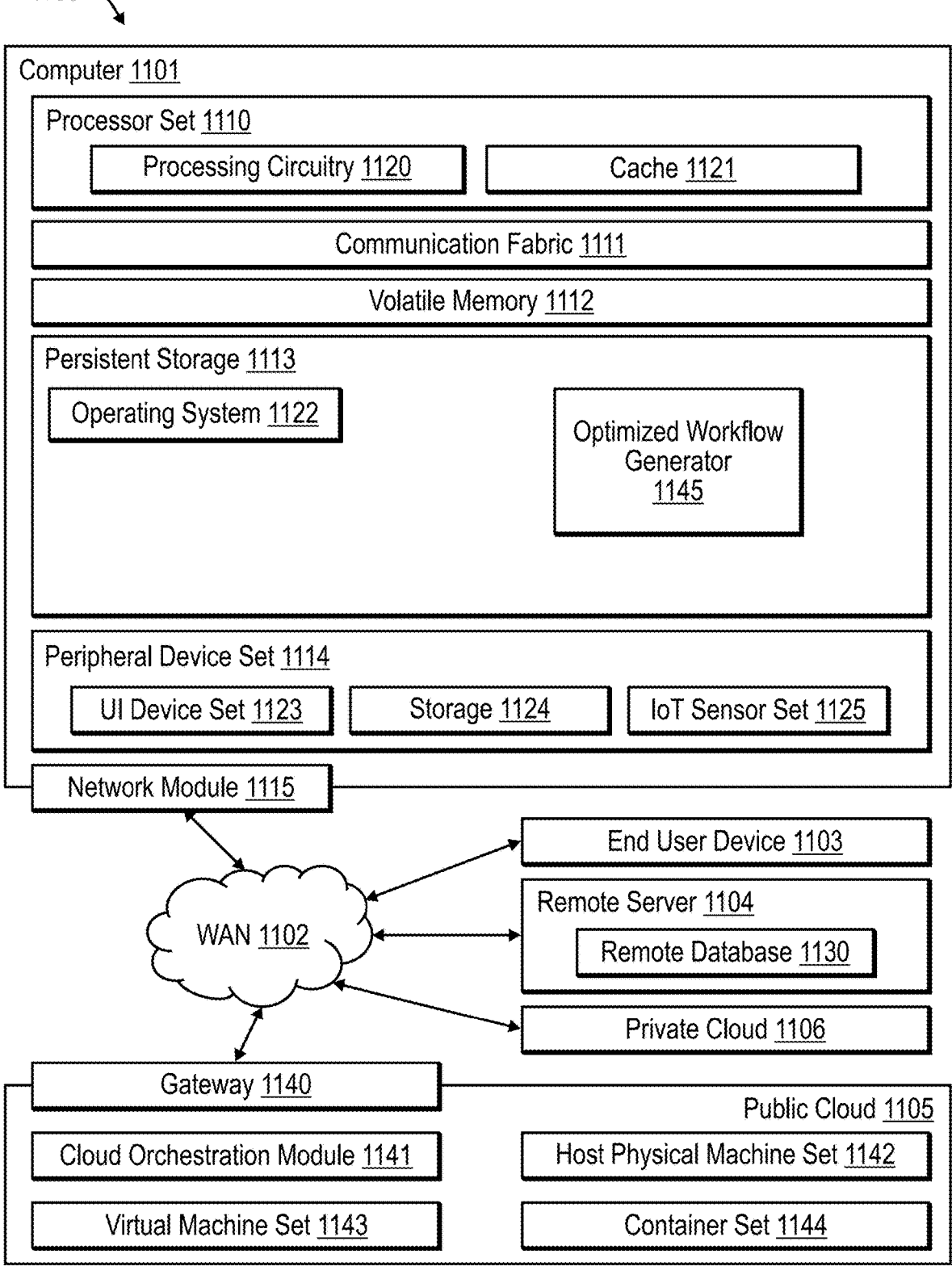
FIG. 11 illustrates a computing environment in which the components of FIG. 1 may be implemented.

With respect to FIG. 11, computing environment 1100 contains an example of an environment for the execution of at least some of the computer code involved in performing the inventive methods, such as an optimized workflow generator 1145 for generating an optimized workflow graphs for scenario workflows. The optimized workflow generator 1145, in certain embodiments, may include the components of FIG. 1, including 106, 108, 110, 112, 114, 118, 122, and 126. In addition to block 1145, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1145, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer-readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1145 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1145 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage

1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer-readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on. In certain embodiments, the EUDs 1103 may generate requests that invoke a scenario workflow according to an optimized workflow graph.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

CLOUD COMPUTING SERVICES AND/OR MICRO-SERVICES (not separately shown in FIG. 11): private and public clouds 1106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer implemented method for managing agents in a computing environment, comprising:

processing documents to determine scenarios in which the agents are deployed, tools invoked by the agents to perform processes defined for the agents in the documents, and workflows of the agents and the tools in the scenarios;

generating a workflow graph having nodes representing the agents invoked in the scenarios and the tools invoked by the agents, wherein the workflow graph includes paths between the agents in the scenarios indicating an order in which the agents are invoked in the scenarios and the tools invoked by the agents in the scenarios;

determining workloads at the nodes in the workflow graph;

identifying, by an agent reorganizer, executing in the computing environment, a node comprising an agent executing in the computing environment, represented in the workflow graph and having a workload in the computing environment exceeding a threshold;

modifying the identified node in a modified workflow graph to reduce the workload at the identified node in the computing environment to redistribute the workload of the identified node across other nodes executing in the computing environment; and providing the modified workflow graph to execute the agents and the tools according to the modified workflow graph defined at the nodes of the modified workflow graph.

2. The computer implemented method of claim 1, wherein the identifying the node comprises determining a target node having connecting paths from source nodes calling the target node in different scenarios.

3. The computer implemented method of claim 2, wherein the target node comprises a first target node, wherein the source nodes comprise a first source node connecting to the first target node via a first path in a first scenario and a second source node connecting to the first target node via a second path in a second scenario, wherein modifying the identified node comprises:

adding a second target node representing an additional instance of an agent or tool represented by the first target node; and modifying the first path from the first target node to disconnect from the first target node and connect to the second target node in the first scenario to indicate the first source node calls the agent or the tool represented by the second target node, wherein the second path remains connected to the first target node in the second scenario to indicate the second source node calls the agent or the tool represented by the first target node.

4. The computer implemented method of claim 3, wherein a third path connects the first target node in the first scenario to a third target node and wherein a fourth path connects the first target node in the second scenario to a fourth target node, wherein the modifying the identified node further comprises:

modifying the fourth path to connect the second target node to the fourth target node.

5. The computer implemented method of claim 1, wherein the identifying the node comprises determining a target node that has a workload exceeding a threshold and connected to by source nodes in different scenarios, further comprising:

dividing the source nodes into n sets, wherein the source nodes in each of the n sets contribute to the workload of the target node that combined are less than the threshold;

creating n−1 target nodes representing an agent or tool represented by the target node; and for each set of n−1 sets, modifying the paths of the source nodes in the set to disconnect from the target node and connect to the n−1 target nodes.

6. The computer implemented method of claim 1, wherein the identifying the node comprises determining a source node and target node in the workflow graph, such that the source node is invoked from the nodes in multiple scenarios and there are multiple paths between the source node and the target node in the workflow graph representing the source node invoking the target node in the multiple scenarios over the multiple paths.

7. The computer implemented method of claim 6, wherein the modifying the identified node comprises:

generating a new node in the modified workflow graph representing functionality of the agents or the tools represented by the source node and the target node.

8. The computer implemented method of claim 7, further comprising:

removing the source node from the modified workflow graph; and modifying the paths from the nodes connecting to the source node to connect to the new node in the modified workflow graph.

9. The computer implemented method of claim 8, further comprising:

determining whether there are other nodes other than the source node connected to the target node; and removing the target node from the modified workflow graph in response to determining that only the source node is connected to the target node.

10. The computer implemented method of claim 1, wherein the processing the documents comprises extracting the processes, actions, and the workflows for the scenarios, further comprising:

inputting the extracted processes, actions and workflows for the scenarios into a large language model to generate agent architectures for the scenarios representing agents invoked in the workflows; and processing the agent architectures to generate workflow graphs for the scenarios defining how the agents, the tools, and commands are invoked in the workflows, wherein the workflow graph is generated by combining the workflow graphs for the scenarios into a single workflow graph representing the nodes that are invoked from multiple scenarios.

11. A computer system for managing agents in a computing environment, comprising:

a processor set;

one or more computer-readable storage media; and program instructions stored on the one or more computer-readable storage media to cause the processor set to perform operations comprising:

processing documents to determine scenarios in which the agents are deployed, tools invoked by the agents to perform processes defined for the agents in the documents, and workflows of the agents and the tools in the scenarios;

generating a workflow graph having nodes representing the agents invoked in the scenarios and the tools invoked by the agents, wherein the workflow graph includes paths between the agents in the scenarios indicating an order in which the agents are invoked in the scenarios and the tools invoked by the agents in the scenarios;

determining workloads at the nodes in the workflow graph;

identifying, by an agent reorganizer, executing in the computing environment, a node comprising an agent executing in the computing environment, represented in the workflow graph and having a workload in the computing environment exceeding a threshold;

modifying the identified node in a modified workflow graph to reduce the workload at the identified node in the computing environment to redistribute the workload of the identified node across other nodes executing in the computing environment; and providing the modified workflow graph to execute the agents and the tools according to the modified workflow graph defined at the nodes of the modified workflow graph.

12. The computer system of claim 11, wherein the identified node comprises a first target node, wherein a first source node connects to the first target node via a first path in a first scenario and a second source node connects to the first target node via a second path in a second scenario, wherein modifying the identified node comprises:

adding a second target node representing an additional instance of an agent or tool represented by the first target node; and modifying the first path from the first target node to disconnect from the first target node and connect to the second target node in the first scenario to indicate the first source node calls the agent or the tool represented by the second target node, wherein the second path remains connected to the first target node in the second scenario to indicate the second source node calls the agent or the tool represented by the first target node.

13. The computer system of claim 11, wherein the identifying the node comprises determining a target node that has a workload exceeding a threshold and connected to by source nodes in different scenarios, further comprising:

dividing the source nodes into n sets, wherein the source nodes in each of the n sets contribute to the workload of the target node that combined are less than the threshold;

creating n−1 target nodes representing an agent or tool represented by the target node; and for each set of n−1 sets, modifying the paths of the source nodes in the set to disconnect from the target node and connect to the n−1 target nodes.

14. The computer system of claim 11, wherein the identifying the node comprises determining a source node and target node in the workflow graph, such that the source node is invoked from the nodes in multiple scenarios and there are multiple paths between the source node and the target node in the workflow graph representing the source node invoking the target node in the multiple scenarios over the multiple paths.

15. The computer system of claim 14, wherein the modifying the identified node comprises:

generating a new node in the modified workflow graph representing functionality of the agents or the tools represented by the source node and the target node.

16. A computer program product comprising:

one or more computer-readable storage media; and program instructions stored on the one or more computer-readable storage media to perform operations comprising:

processing documents to determine scenarios in which agents are deployed, tools invoked by the agents to perform processes defined for the agents in the documents, and workflows of the agents and the tools in the scenarios;

generating a workflow graph having nodes representing the agents invoked in the scenarios and the tools invoked by the agents, wherein the workflow graph includes paths between the agents in the scenarios indicating an order in which the agents are invoked in the scenarios and the tools invoked by the agents in the scenarios;

determining workloads at the nodes in the workflow graph;

identifying, by an agent reorganizer, executing in a computing environment, a node comprising an agent executing in the computing environment, represented in the workflow graph and having a workload in the computing environment exceeding a threshold;

modifying the identified node in a modified workflow graph to reduce the workload at the identified node in the computing environment to redistribute the workload of the identified node across other nodes executing in the computing environment; and providing the modified workflow graph to execute the agents and the tools according to the workflows defined at the nodes of the modified workflow graph.

17. The computer program product of claim 16, wherein the identified node comprises a first target node, wherein a first source node connects to the first target node via a first path in a first scenario and a second source node connects to the first target node via a second path in a second scenario, wherein modifying the identified node comprises:

adding a second target node representing an additional instance of an agent or tool represented by the first target node; and modifying the first path from the first target node to disconnect from the first target node and connect to the second target node in the first scenario to indicate the first source node calls the agent or the tool represented by the second target node, wherein the second path remains connected to the first target node in the second scenario to indicate the second source node calls the agent or the tool represented by the first target node.

18. The computer program product of claim 16, wherein the identifying the node comprises determining a target node that has the workload exceeding the threshold and connected to by source nodes in different scenarios, further comprising:

dividing the source nodes into n sets, wherein the source nodes in each of the n sets contribute to the workload of the target node that combined are less than the threshold;

creating n−1 target nodes representing an agent or tool represented by the target node; and for each set of n−1 sets, modifying the paths of the source nodes in the set to disconnect from the target node and connect to the n−1 target nodes.

19. The computer program product of claim 16, wherein the identifying the node comprises determining a source node and target node in the workflow graph, such that the source node is invoked from the nodes in multiple scenarios and there are multiple paths between the source node and the target node in the workflow graph representing the source node invoking the target node in the multiple scenarios over the multiple paths.

20. The computer program product of claim 19, wherein the modifying the identified node comprises:

generating a new node in the modified workflow graph representing functionality of the agents or the tools represented by the source node and the target node.

\* \* \* \* \*